(12) United States Patent
Sueyoshi et al.

(10) Patent No.: US 9,441,095 B2
(45) Date of Patent: Sep. 13, 2016

(54) METHOD OF PRODUCING HOLLOW SILICA MICROPARTICLES

(75) Inventors: Ryota Sueyoshi, Kitakyushu (JP); Ryo Maruguchi, Kitakyushu (JP); Masayuki Matsuda, Kitakyushu (JP); Mitsuaki Kumazawa, Kitakyushu (JP); Toshiharu Hirai, Kitakyushu (JP)

(73) Assignee: JGC CATALYSTS AND CHEMICALS LTD., Kawasaki-Shi, Kanagawa (JP)

( * ) Notice: Subject to any disclaimer, the term of this patent is extended or adjusted under 35 U.S.C. 154(b) by 751 days.

(21) Appl. No.: 13/352,870

(22) Filed: Jan. 18, 2012

(65) Prior Publication Data

US 2012/0111231 A1   May 10, 2012

Related U.S. Application Data

(62) Division of application No. 12/085,367, filed as application No. PCT/JP2006/322961 on Nov. 17, 2006, now abandoned.

(30) Foreign Application Priority Data

Nov. 25, 2005   (JP) .................................. 2005-340617

(51) Int. Cl.

| | | |
|---|---|---|
| C08K 7/26 | (2006.01) | |
| B82Y 30/00 | (2011.01) | |
| C01B 33/146 | (2006.01) | |
| C01B 33/149 | (2006.01) | |
| C09C 1/30 | (2006.01) | |
| C09D 7/12 | (2006.01) | |
| C09D 133/14 | (2006.01) | |
| C09D 183/08 | (2006.01) | |
| C01B 33/12 | (2006.01) | |
| B01J 21/08 | (2006.01) | |
| C01B 33/18 | (2006.01) | |
| C08K 9/04 | (2006.01) | |

(52) U.S. Cl.
CPC .................. *C08K 7/26* (2013.01); *B82Y 30/00* (2013.01); *C01B 33/146* (2013.01); *C01B 33/149* (2013.01); *C09C 1/30* (2013.01); *C09C 1/3063* (2013.01); *C09D 7/1266* (2013.01); *C09D 7/1275* (2013.01); *C09D 7/1291* (2013.01); *C09D 133/14* (2013.01); *C09D 183/08* (2013.01); *B01J 21/08* (2013.01); *C01B 33/126* (2013.01); *C01B 33/18* (2013.01); *C01P 2002/88* (2013.01); *C01P 2004/34* (2013.01); *C01P 2004/62* (2013.01); *C01P 2004/64* (2013.01); *C01P 2006/12* (2013.01); *C01P 2006/60* (2013.01); *C08K 9/04* (2013.01); *Y10T 428/265* (2015.01); *Y10T 428/2993* (2015.01); *Y10T 428/2996* (2015.01)

(58) Field of Classification Search
CPC ....... C01B 33/18; C01B 33/126; B01J 21/08
USPC ................ 423/325, 335, 342, 347; 502/232; 427/452
See application file for complete search history.

(56) References Cited

FOREIGN PATENT DOCUMENTS

JP           2004203683 A   *   7/2004   ........... C01B 33/193

* cited by examiner

*Primary Examiner* — Matthew E Hoban
*Assistant Examiner* — James Fiorito
(74) *Attorney, Agent, or Firm* — Manabu Kanesaka

(57) ABSTRACT

A method of producing hollow silica microparticles that suppress whitening of a transparent coating film and show excellent abrasion resistance and adhesiveness. The method includes preparation of an organosol in which hollow silica microparticles are dispersed with the silica concentration of 1 to 70 W % and addition of a silane compound and an alkali catalyst to the organosol at a temperature in the range from 30° C. to 300° C. to react the silane compound to the hollow silica microparticles under the condition where a quantity of water against the added silica (the hollow silica microparticles) is in the range from 0.1 to 50 W %.

15 Claims, No Drawings

METHOD OF PRODUCING HOLLOW SILICA MICROPARTICLES

CROSS-REFERENCE TO RELATED APPLICATION

This is a divisional application of Ser. No. 12/085,367 filed on May 22, 2008.

The present invention relates to a method of producing the hollow silica microparticles. The hollow silica microparticles having a surface processed with a silane compound, compositions for forming a transparent coating film containing the hollow silica microparticles, and a substrate having a surface coated with a transparent coating film prepare by curing the composition for forming a transparent coating film are also described.

BACKGROUND TECHNOLOGY

Hollow silica particles with the diameter of about 0.1 to about 380 μm are well known (Refer to Patent document 1 and Patent document 2). Furthermore, there has been known the method of producing hollow particles having a hard silica shell in which active silica is deposited from an aqueous solution of alkali metal silicate on a core made of a material other than silica, and the material is removed without breaking the silica shell (Refer to Patent document 3).

Furthermore, there has been known the micron-sized spherical silica particles having the core shell structure in which the external spherical surface is a shell, the central portion thereof is hollow, and the shell has a density gradient from the dense outer side toward the thin inner side (Refer to Patent document 4).

The present applicant proposed in the past to obtain composite oxide microparticles with a low refractive index and also having the size at a level of nanometers by completely coating surfaces of porous inorganic microparticles with such materials as silica (Refer to Patent document 5), and furthermore proposed to obtain silica-based hollow microparticles with a low refractive index and having the size at a level of nanometers by forming a silica coating layer on core particles of composite oxides comprising silica and inorganic oxides other than silica, removing the inorganic oxides other than silica, and coating the particles with silica (Refer to Patent document 6).

Furthermore, addition of spherical microparticles to an organic resin film is a known technique, and there has been known the fact that, with the technique, transparency of the obtained film is improved (Refer to Patent document 7).

In the films containing the silica particles or the transparent coating films as described above, there often occurs the problem that the obtained films or the transparent coating films are whitened.

Patent document 8 includes descriptions concerning the fact that, in compositions for coating containing (a) a partial condensate of an organic silicon compound comprising 100 weight portions of trialkoxysilane expressed by general formula: $RSi(OR_1)_3$ [R: a hydrocarbon group containing 1 to 6 carbon atoms, $R_1$: an alkyl group containing 1 to 6 carbon atoms] and 20 to 130 weight portions of tetraalkoxysilane expressed by the general formula of $Si(OR_2)_4$ [$R_2$: an alkyl group containing 1 to 6 carbon atoms; and (b) 0.05 to 200 weight portions of silica microparticles against 100 weight portions of the partial condensate $(RSiO_{3/2}+SiO_2)$ when the trialkoxysilane is calculated as $RSiO_{3/2}$ and the tetraalkoxysilane as $SiO_2$, whitening of the coating film can be suppressed by limiting a blending quantity of silica microparticles.

Patent document 9 proposes a method of using the inorganic compound particles with the average particle diameter of 50 nm or below for preventing whitening of a transparent coating film obtained by applying an embrocation for forming a transparent coating film in which (A) a acetylacetonato-chelate compound and (B) inorganic compound microparticles are homogeneously dissolved or dispersed in a mixture solvent of water and an organic solvent to a base material and curing the embrocation.

Patent document 10 proposes a reflection-preventive film with the surface hardly damaged by frictions or the like and also with the low refractive index layer not separated, and the reflection-preventive film has a hard coat layer based on a UV cure resin mainly made of a multifunctional monomer containing two or more (metha) acryloyloxy groups in the molecule with inorganic microparticles having the average particle diameter of 0.5 to 100 nm added in the matrix, the hard coat layer formed on at least one surface of a transparent plastic film substrate, and a low refractive index layer formed on the hard coat layer and based on a matrix made of a copolymer of an organic silicon compound or a polymer thereof and an organic silicon compound or a polymer thereof with silica microparticles having the average particle diameter of 0.5 to 100 nm added therein, and the document also describes that, when using the inorganic microparticles with the average particle diameter of less than 20 nm, whitening of the hard coat layer due to scattering of light can be prevented.

As a transparent coating film containing hollow silica microparticles and an embrocation for forming the transparent coating film, for instance, Patent document 11 discloses an invention relating to a transparent film-coated substrate formed thereon, and the substrate comprises a base material and a transparent coating film provided on a surface of the substrate, and the transparent coating film has (i) a matrix containing a silicon component in turn containing a fluorine-substituted alkyl group and (ii) an outer shell layer, and also contains inorganic compound particles which are porous or have many cavities therein. The transparent coating film is also characterized that the porosity or the cavities are preserved therein. In the transparent coating film containing hollow silica microparticles and a binder as described above, however, although the low refractive index of about 1.25 to about 1.45 specific to the hollow silica microparticles can be realized, whitening of the coating film easily occurs, and there is the need for further improving the adhesiveness to the base material and the abrasion resistance.

Patent document 1: JP H06-330606A
Patent document 2: JP H07-013137A
Patent document 3: JP 2000-500113A
Patent document 4: JP H11-029318A
Patent document 5: JP H07-133105A
Patent document 6: JP 2001-233611A
Patent document 7: JP H04-348147A
Patent document 8: JP H01-306476A
Patent document 9: JP H04-247427A
Patent document 10: JP 2004-326100A
Patent document 11: JP 2002-79616A

DISCLOSURE OF THE INVENTION

Problems to be Solved by the Invention

When a coating composition containing hollow silica microparticles and a binder is prepared and a transparent coating film is formed on a substrate using the coating composition, a transparent coating film having a lower refractive index as compared to that when a composition containing ordinary silica microparticles and a binder is prepared and a transparent coating film is formed by using the composition, but when hollow silica microparticles are used, whitening more easily occurs in the transparent coating film, which is disadvantageous, and in addition, there is also the need for further improving the abrasion resistance and adhesiveness.

The present invention was made to solve the problems as described above, and it is an object of the present invention to provide hollow silica microparticles capable of suppressing, even when a coating composition containing hollow silica microparticles and a binder is prepared and a transparent coating film is formed on a substrate, whitening of the transparent coating film and showing the excellent abrasion resistance and the adhesiveness and also to provide a method of producing the hollow silica microparticles. It is another object of the present invention to provide compositions for forming a transparent coating film containing the hollow silica microparticles showing the excellent effects as described above and a transparent film-coated substrate obtained by curing the composition for forming a transparent coating film.

It is another object of the present invention to provide a transparent film-coated substrate in which hollow silica microparticles are unevenly distributed in the layer state, and compositions for forming a transparent coating film to produce the substrate as described above. It is still another object of the present invention to provide a transparent film-coated substrate in which hollow silica microparticles and metal oxide microparticles are unevenly distributed in the layered state respectively and compositions for forming a transparent coating film to produce the substrate as described above.

Means for Solving the Problems

The present invention provides, in a first aspect thereof, hollow silica microparticles having the average particle diameter of 5 to 300 nm when measured by the dynamic light scattering method, and the specific surface area of 50 to 1500 m²/g, and also having an outer shell in which cavities are formed, and the hollow silica microparticles lose the weight by 1.0 W % (weight %) or more at a temperature range from 200° C. to 500° C. when measured by the thermogravimetry (TG).

The present invention is characterized in a second aspect thereof in that the hollow silica microparticles have a positive DTA peak at a temperature in the range from 200° C. to 500° C. when measured by the differential thermogravimetric analysis (DTA).

The present invention is characterized in a third aspect thereof in that the hollow silica microparticles have an organic group directly bonded to a silicon atom on a surface thereof.

The present invention is characterized in a fourth aspect thereof in that the hollow silica microparticles has an organic group directly bonded to a silicon atom on a surface thereof and the organic group is one or more selected from the group consisting of saturated or unsaturated hydrocarbon groups having 1 to 18 carbon atoms and halogenated hydrocarbon groups having 1 to 18 carbon atoms.

The present invention provides, in a fifth aspect thereof, a method of producing hollow silica microparticles comprising the steps of preparing an organosol with the silica concentration of 1 to 70 W % in which hollow silica microparticles are dispersed; and adding a silane compound and an alkali catalyst to the organosol at a temperature in the range from 30° C. to 300° C. to react the silane compound to the hollow silica microparticles under the condition that a quantity of water against the added silica (the hollow silica microparticles) is in the range from 0.1 to 50 W %.

The preset invention provides, in a sixth aspect thereof, a method of producing hollow silica microparticles in which a quantity of added silane compound is in the range from 1 to 50 weight portions against 100 weight portions of the hollow silica microparticles and a quantity of added alkali catalyst is in the range from 20 to 2,000 ppm against the organosol.

The present invention provides, in a seventh aspect thereof, compositions for forming a transparent coating film in which hollow silica microparticles relating to any of the first to fourth aspects of the present invention and a binder are contained.

The present invention provides, in an eighth aspect thereof, a substrate having a surface coated with a transparent coating film prepared by curing the composition for forming a transparent coating film relating to the seventh aspect of the present invention.

The present invention provides, in a ninth aspect thereof, the hollow silica microparticles in the fourth aspect, and the hollow silica microparticles are furthermore characterized in that the microparticles have the organic group expressed by general formula (1) or (2) and lose the weight by 1.5 W % or more at a temperature in the range from 200° C. to 500° C. when measured by thermogravimetry (TG).

—R—OC(=O)CCH₃=CH₂  General formula (1)

(R: A bivalent hydrocarbon group having 1 to 12 carbon atoms)

—R—OC(=O)CH=CH₂  General formula (2)

(R: A bivalent hydrocarbon group having 1 to 12 carbon atoms)

The present invention provides, in a tenth aspect, the hollow silica microparticles in the fourth aspect, but the hollow silica microparticles have the organic group expressed by general formula (3):

—R—C$_n$F$_a$H$_b$  General formula (3)

($a+b=2n+1$, n is an integer of 1 to 3, while R is a bivalent hydrocarbon group having 1 to 12 carbon atoms).

The present invention provides, in an eleventh aspect thereof, compositions for forming a transparent coating film in which a surface charge ($Q_A$) of the hollow silica microparticles contained in the composition for forming the transparent coating film relating to the seventh aspect of the present invention is in the range from 5 to 20 eq/g.

The present invention provides, in a twelfth aspect thereof, composition for forming a transparent coating film in which a concentration ($C_{PA}$) of the hollow silica microparticles contained in the composition relating to the eleventh aspect of the present invention is in the range from 0.1 to 20 W %, a concentration ($C_M$) of the binder as a solid is in the range from 1 to 50 W %, and the solvent is a polar solvent.

The present invention provides, in a thirteenth aspect thereof, compositions for forming a transparent coating film relating to the seventh aspect of the present invention in which hollow silica microparticles with the surface charge ($Q_A$) in the range from 5 to 20 µeq/g are contained, also metal oxide microparticles with the surface charge ($Q_B$) in the range from 51 to 150 µeq/g are contained, and a value of the difference between the surface charge ($Q_B$) of the metal oxide microparticles and that ($Q_A$) of the hollow silica microparticles [($Q_B$)−($Q_A$)] is in the range from 20 to 100 μeq/g.

The present invention provides, in a fourteenth aspect thereof, compositions for forming a transparent coating film in which a concentration ($C_{PA}$) of the hollow silica microparticles contained in the compositions relating to the thirteenth aspect of the present invention is in the range from 0.1 to 20 W %, a concentration ($C_{PB}$) of the metal oxide microparticles is in the range from 0.1 to 20 W %, and a concentration ($C_M$) of the binder as a solid is in the range from 1 to 50 W %, and a solvent thereof is a polar one.

The present invention provides, in a fifteenth aspect thereof, a substrate having a surface coated with a transparent coating film (with the thickness of 100 nm to 10000 nm) prepared by curing the composition for forming a transparent coating film relating to the eleventh or twelfth aspect of the present invention, in which the hollow silica microparticles are unevenly distributed and dispersed in the outer side of the surface from the middle point in the thickness direction of the transparent coating film.

The present invention provides, in a sixteenth aspect thereof, the transparent film-coated substrate relating to the fifteenth aspect, in which the hollow silica microparticles are unevenly distributed and dispersed in the single-layered or multilayered state.

The present invention provides, in a seventeenth aspect thereof, a substrate having a surface coated with the transparent substrate (with the thickness of 100 nm to 10000 nm) prepared by curing the composition for forming a transparent coating film relating to the thirteenth or fourteenth aspect of the present invention, in which the hollow silica microparticles are unevenly distributed and dispersed in the surface side outer from the middle point in the thickness direction of the transparent coating film and the metal oxide microparticles are unevenly distributed and dispersed in the substrate side inner from the middle point in the thickness direction of the film.

The present invention provides, in an eighth aspect thereof, the transparent film-coated substrate relating to the seventeenth aspect, in which the hollow silica microparticles are unevenly distributed and dispersed in the single-layered or multilayered state and the metal oxide microparticles are also unevenly distributed and distributed in the single-layered or multilayered state.

The present invention provides, in a nineteenth aspect thereof, hollow silica microparticles with the average particle diameter of 5 to 300 nm when measured by the dynamic light scattering method, and the specific surface area of 50 to 1500 m²/g and having an outer shell in which cavities are formed, and the hollow silica microparticles lose the weight by 1.0 W % or more at a temperature in the range from 200° C. to 500° C. when measured by the thermogravimetry (TG), have a positive DTA peak at the temperature range when measured by the differential thermogravimetric analysis (DTA), have an organic group directly bonded to a silicon atom on a surface thereof, and also have a surface charge ($Q_A$) in the range from 5 to 20 μeq/g.

The present invention provides, in a twentieth aspect thereof, a method of producing hollow silica microparticles comprising the steps of preparing an organosol with the concentration of silica in the hollow silica microparticles in the range from 1 to 70 W %, and adding a silane compound and/or a multifunctional acrylic acid ester resin having a hydrophobic functional group, and an alkali catalyst to react the silane compound to the hollow silica microparticles in the state where a quantity of water against the added silica is in the range from 0.1 to 50 W %.

Effects of the Invention

The transparent coating film obtained by applying the compositions for forming a transparent coating film containing hollow silica microparticles and a binder according to the present invention has a low refractive index in the range from 1.25 to 1.45, and discoloring such as whitening hardly occurs in the compositions, and the compositions are excellent in the abrasion resistance and the adhesiveness. Furthermore the transparent coating film is also excellent in the chemical resistance and the water resistance, and for instance, when water droplets dropped on a surface of the transparent coating film according to the present invention are wiped off, advantageously no trace of the droplets is left.

With the production method according to the present invention, the hollow silica microparticles can efficiently be produced.

Of the substrates each with a transparent coating film according to the present invention, especially those having a transparent coating film in which a specific quantity of hollow silica microparticles are unevenly distributed in the layer state show the excellent characteristics based on the hollow silica microparticles (such as the capability of suppressing reflection and the antistatic property). Furthermore, in the transparent film-coated substrate according to the present invention, when prespecified hollow silica microparticles and prespecified metal oxide microparticles are unevenly distributed in the layered state respectively, in addition to the characteristics provided by the hollow silica microparticles, also the characteristics based on the metal oxide microparticles are easily and strongly shown. Especially, with the compositions for forming a transparent coating film according to the present invention in which prespecified hollow silica microparticles and prespecified metal oxide microparticles are contained, it is possible to obtain a transparent coating film in which hollow silica microparticles and metal oxide microparticles are unevenly distributed in the layered state respectively or a substrate having the transparent coating film.

BEST MODE FOR CARRYING OUT THE INVENTION

[Hollow Silica Microparticles]

The hollow silica microparticles according to the present invention have an outer shell with cavities formed therein and also have an average particle diameter of 5 to 300 nm and a specific surface area of 50 to 1500 m²/g, and lose the weight by 1.0 W % or more at a temperature in the range from 200° C. to 500° C. when measured by the thermogravimetry (TG). The hollow silica microparticles generally show a positive DTA peak when measured by the differential thermogravimetrical analysis at a temperature from 200° C. to 500° C.

The hollow silica microparticles according to the present invention are generally prepared by subjecting known hollow silica microparticles to a surface processing with a silane compound. More specifically, because of a hydrolysis reaction between a silanol group on a surface of the hollow silica microparticles and the silane compound, an organosilyl group (monoorganosilyl, diorganosilyl, or triorganosilyl group) directly bonds to a surface of the hollow silica microparticles, and the hollow silica microparticles according to the present invention have a number of organo silyl groups each directly bonding to a silicon atom on a surface thereof.

It is generally said that the organic group as described above bonds to a surface of the hollow silica microparticle with a structure like Si—O—SiA$_3$(A: an organic group) through the reaction between the silane compound and the silanol group on a surface of the hollow silica microparticle.

The thermogravimetric analysis is performed to measure a change in a weight of a sample due to up and down of the atmospheric temperature around the sample, and the change showing a change in a weight against that in a temperature is called TG curve. The differential thermogravimetric analysis is performed to measure a calorimetric change against a change in a temperature by detecting a difference between a temperature of a reference and that of a sample making use of a an electromotive force of a thermocouple provided in sample container, and a curve showing a relation between a temperature change and a calorimetric change is referred to as DTA curve.

It is generally known that, when an exothermal reaction occurs, a positive peak appears on the DTA curve. Furthermore, the thermogravimetry/differential thermal analysis (generally referred to as TG/DTA) is known as a method for simultaneously executing the thermogravimetry and the differential thermogravimetric analysis. In this TG/DTA, it is possible to simultaneously monitor a change in a weight of a sample and an endothermal or exothermal reaction when a sample is heated, and therefore the technique can be applied to access compositions or thermal properties of various substances.

The hollow silica microparticles according to the present invention show excellent effects not provided by conventional silica microparticles or hollow silica microparticles. More specifically, because of the excellent effects, for instance, when a composition for forming a transparent coating film prepared by mixing the hollow silica microparticles according the present invention with a binder is cured on a substrate, a transparent film-coated substance having excellent properties can be obtained. Different from a transparent film-coated substrate prepared by using the composition for forming a transparent coating film containing known silica microparticles or hollow silica microparticles, with the hollow silica microparticles according to the present invention, it is possible to provide a transparent film-coated substrate capable of suppressing whitening and having improved abrasion resistance and adhesiveness.

Namely, in the transparent film-coated substrate containing the hollow silica microparticles according to the present invention which have the calorimetric and thermogravimetric properties as described above, whitening can be suppressed and the abrasion resistance and the adhesiveness are improved. On the other hand, in transparent film-coated substrates containing the conventional type of hollow silica microparticles, hollow silica microparticles not having been subjected to surface processing with a silane compound, hollow silica microparticles not remarkable weight loss at a temperature in the range from 200° C. to 500° C., or those having been subjected to surface process different from that employed in the method of producing hollow silica microparticles according to the present invention, whitening occurs in the transparent coating films, and the abrasion resistance and the adhesiveness are not sufficient.

In contrast, in the hollow silica microparticles according to the present invention, the organosilyl groups present on a surface of the hollow silica microparticles directly bond to silicon atoms respectively with the structure of —Si—O—SiR$_3$ (R: an organic group) also present on a surface of the particles in the stable state at a temperature of up to 200° C., which is guessed as a reason for suppression of aggregation of silica microparticles in the transparent coating film causing whitening in the transparent coating film because the organosilyl groups are present therein as substitutional groups tightly bonded to surfaces of the hollow silica microparticles when a transparent film-coated substrate is formed. Furthermore, it can be considered that presence of the organosilyl group contributes to improvement in dispersibility of silica microparticles in an organosol and a transparent coating film as well as to making more fine-grained the transparent coating film because of a chemical bond with a binder resin, and that the properties give excellent abrasion resistance and adhesiveness to the transparent coating film.

On the other hand, in a case of the conventional hollow silica microparticles, an organosilyl group is not present on a surface thereof, so that the effects observed when the hollow silica microparticles according to the present invention are used is not provided by the conventional hollow silica microparticles. Furthermore, in a case of hollow silica microparticles not subjected to surface processing by the method employed when the hollow silica microparticles according to the present invention are produced, weight loss of 1.0 W % or more due to heat can not be observed at a temperature of 200° C. or more, and therefore it can be considered that a strong bond is not formed when the particles are subjected to surface processing, and it may be said that the effects as provided by the hollow silica microparticles according to the present invention are hardly achieved also in this case like in a case of the conventional hollow silica microparticles.

In the case of the hollow silica microparticles according to the present invention, in addition to the thermogravimetric properties as described above, a specific peak is observed at a temperature in the range from 200° C. to 500° C. also in differential thermogravimetric analysis, while the peak is not observed in the cases of conventional hollow silica microparticles and hollow silica microparticles not subjected to surface processing in the same way as that employed in the method of producing hollow silica microparticles according to the present invention.

It is known that a peak in the DTA curve indicates occurrence of an exothermal reaction associated with separation of an organic group. In the present invention, generally a peak in the DTA curve appears at a temperature range (from 200° C. to 500° C.) where the thermogravimetric property described above appear.

An average particle diameter of the hollow silica microparticles according to the present invention is preferably in the range from 5 to 300 nm. The hollow silica microparticles having the average particle diameter in this range are preferable for obtaining a transparent coating film. It is difficult to obtain hollow silica microparticles with the average particle diameter of less than 5 nm. When the average particle diameter is more than 300 nm, scattering of light becomes remarkable, and when the hollow silica microparticles are processed into a thin film, the reflection is high, which spoils the antireflection capability. The average diameter of the hollow silica microparticles according to the present invention is more preferably in the range 10 to 200 nm, and further more preferably in the range from 10 to 100 nm.

A specific surface area of the hollow silica microparticles according to the present invention is preferably in the range from 50 to 1500 m$^2$/g for obtaining dispersibility and stability of the hollow silica microparticles in a solvent or at the step of processing the hollow silica microparticles into a film. When the specific surface area is less than 50 m²/g, it is difficult to obtain hollow silica microparticles having a low refractive index. On the other hand, when the specific surface area is over 1500 m²/g, the dispersibility and stability of the hollow silica microparticles become lower, which is not desirable. The specific surface area of the hollow silica microparticles according the present invention is preferably in the range from 50 to 200 m²/g.

The hollow silica microparticles according to the present invention are required to show weight loss of 1.0 W % or more in thermogravimetry at a temperature in the range from 200° C. to 500° C. In a transparent film-coated substrate in which the hollow silica microparticles showing weight loss due to heat of less than 1.0 W % are blended therein, whitening occurs, and both the abrasion resistance and the adhesiveness are insufficient. A degree of the weight loss due to heat is preferably 1.05 W % or more, and more preferably 1.5 W % or more at a temperature in the range from 200 to 500° C.

The hollow silica microparticles according to the present invention preferably show a peak when measured by the differential thermogravimetric analysis at a temperature in the range from 200° C. to 500° C. Generally, when the hollow silica microparticles show the weight loss due to heat in the same temperature range, at least one peak can be observed in the differential thermogravimetric analysis.

The hollow silica microparticles according to the present invention have an organic group directly bonded to a silicon atom on a surface thereof. There is not specific restriction concerning a type of the organic group, and any type of organic group is allowable on the condition that the organic group has affinity with a binder used when a composition for forming a transparent coating film is prepared, especially with an organic resin, does not cause whitening of a transparent coating film in a transparent film-coated substrate obtained by curing the composition for forming a transparent coating film on a substrate, nor spoils the abrasion resistance and the adhesiveness. For instance, the organic group may be a hydrocarbon group or that having an atom other than a carbon atom and a hydrogen atom. The hydrocarbon group may be either aliphatic or aromatic, and also may be a saturated hydrocarbon group or an unsaturated one. The organic group may have a double bond or a triple bond, and also may have an ether bond.

The atoms other than a carbon atom and a hydrogen atom include, but not limited to an oxygen atom, a nitrogen atom, a fluorine atom, a chlorine atom, a bromide atom, a sulfur atom, a silicon atom, a boron atom, an aluminum atom, a magnesium atom, a sodium atom, a lithium atom, a calcium atom, and a potassium atom.

A preferable example of the organic group directly bonding to a silicon atom is, for instance, one selected from the group consisting of saturated or unsaturated hydrocarbon groups having 1 to 18 carbon atoms and halogenated hydrocarbon groups having 1 to 18 carbon atoms. More specifically, the preferable organic groups include, but not limited to a 3-methacryloxy propyl group, a 3-acryloxy propyl group, 3,3,3-trifluoropropyl group, a methyl group, a phenyl group, an isobutyl group, a vinyl group, a γ-glycidoxy tripropyl group, a γ-methacryloxy propyl group, an N-β (aminoethyl) γ-aminopropyl group, an N-β(aminoethyl) γ-aminopropyl group, a γ-aminopropyl group, and an N-phenyl-γ-aminopropyl group.

The hollow silica microparticles according to the present invention are generally dispersed in an organic solvent. A concentration of silica is preferable in the range from 1 to 70 W % from the viewpoint of stability, and more preferably in the range from 3 to 40 W %.

Preferable Example of the Hollow Silica Microparticles (1)

From the view points of the adhesiveness of a transparent coating film containing the hollow silica microparticles according to the present invention, capability to suppress whitening of a coating film, and the abrasion resistance, the hollow silica microparticles according to the present invention preferably have the organic group expressed by general formula (1) or general formula (2) below, and also preferably show weight loss of 1.5 W % or more when measured by the thermogravimetry (TG) at a temperature in the range from 200° C. to 500° C.:

  General formula (1)

(R: A bivalent hydrocarbon group having 1 to 12 carbon atoms)

  General formula (2)

(R: A bivalent hydrocarbon group having 1 to 12 carbon atoms)

Preferable Example of the Hollow Silica Microparticles (2)

Also for the similar reasons, the hollow silica microparticles according to the present invention preferably have the organic group expressed by the following general formula (3):

  General formula (3)

($a+b=2n+1$, n is an integer of 1 to 3, while R is a bivalent hydrocarbon group having 1 to 12 carbon atoms).

Preferable Example of the Hollow Silica Microparticles (3)

From the view points not only of the adhesiveness of a transparent coating film containing the hollow silica microparticles according to the present invention, capability to suppress whitening of a coating film, and the abrasion resistance, but also of the effect to have the hollow silica microparticles unevenly distributed in the transparent coating film in the layered state as described above, preferably the hollow silica microparticles according to the present invention have an average particle diameter of 5 to 300 nm when measured by the dynamic light scattering method, and a specific surface area of 50 to 1500 m²/g, and also have an outer shell in which cavities are formed therein. Furthermore, the hollow silica microparticles according to the present invention preferably show weight loss of 1.0 W % or more at a temperature in the range from 200° C. to 500° C. and also show a positive DTA peak when measured by the differential thermogravimetric analysis in the same temperature range and have an organic group directly bonding to a silicon atom on a surface thereof. The hollow silica microparticles according to the present invention especially preferably have the surface charge ($Q_A$) in the range from 5 to 20 μeq/g.

[Method of Producing the Hollow Silica Microparticles]

The hollow silica microparticles according to the present invention are produced by using any known hollow silica microparticles as a raw material. Generally, the hollow silica microparticles have fine pores in the outer shell. In the hollow silica microparticles according to the present invention, the outer shell may have fine pores, but the fine pores may disappear due to heating while being produced by the production method as described below.

The hollow silica microparticles used as a raw material in the present invention should have the average particle diameter of 5 to 300 nm and the specific surface area of 50 to 1500 m²/g.

The hollow silica microparticles, which are used as a raw material in the present invention, are produced by simultaneously adding an aqueous solution of a silicate and/or an acidic silicic acid solution and an aqueous solution of an alkali-soluble inorganic compound to an alkali aqueous solution with the pH of 10 or more, or to an alkali aqueous solution with the pH of 10 or more in which seed particles are dispersed, if required, to prepare a dispersion liquid of core particles with the molar ratio of silica versus the inorganic compounds other than silica in the range from 0.3 to 1.0; adding a silica source to the dispersion liquid to form a first silica coating layer on the core particles; and then adding an acid to the dispersion liquid to remove a portion or all of the elements constituting the core particles (Refer to Patent document 6). Furthermore, an alkali aqueous solution, an organic silicon compound and/or a partial hydrolyte thereof are added to the dispersion liquid of the hollow silica microparticles as described above to form a second silica coating layer on the microparticles (Also refer to Patent document 6).

In the method of producing hollow silica microparticles according to the present invention, at first an organosol of the hollow silica microparticles is prepared, and a concentration of silica as a solid component is in the range from 1 to 70 W %.

For instance, a silica sol containing hollow silica microparticles prepared by using water as a dispersant is subjected to solvent substitution to obtain an organosol to be used in the present invention. Generally a ultrafilter membrane or a rotary evaporator is used to obtain an organosol with a concentration of silica as a solid component in the range from 1 to 70 W %.

An organic solvent is used in solvent substitution for the silica sol containing hollow silica microparticles prepared by using water as a dispersant. There is no specific restriction over the type of organic solvent so long as the solvent does not give any negative influence to coating a surface of the hollow silica microparticles with a silane compound. Examples of the organic solvent include, for instance, alcohols, glycols, esters, ketones, nitrogen compounds, and aromatic hydrocarbons. Generally alcohols such as methanol and ethanol are selected.

A concentration of silica as a solid component varies to solvents, and when the concentration is 70 W % or more, the hollow silica microparticles are hardly dispersed in the solvent, and the concentration of less than 1 W % is not practical.

In the production method according to the present invention, an organosol with a silica concentration of 1 to 70 W % is prepared, and a silane compound and an alkali catalyst are added to the organosol at a temperature in the range from 30° C. to 300° C. to react the silane compound to the hollow silica microparticles under the condition that a quantity of water against a quantity of added silica is in the range from 0.1 to 50 W %.

A quantity of added silane compound is generally in the range from 1 to 50 weight portions against 100 weight portions of the hollow silica microparticles. When the quantity is less than 1 weight portions, a percentage of the hollow silica microparticles not processed becomes too high, which is not preferable. On the other hand, when the percentage is over 50 weight portions, a quantity of the silane compound is excessive and not economical. A quantity of added silane compound is preferably in the range from 3 to 25 weight portions.

The silane compound used in the production method according to the present invention is generally expressed with the chemical expression of $R_nSiX_{(4-n)}$ (R: an organic group, X; a hydrolyzable group, and n: an integer of 0 to 3). More specifically, the silane compounds include, but not limited to tetramethoxysilane, tetraethoxysilane, tetraisopropoxysilane, methyl trimethoxysilane, dimethyl dimethoxysilane, phenyl trimethoxysilane, diphenyl dimethoxysilane, methyl triethoxysilane, dimethyl diethoxysilane, phenyl triethoxysilane, diphenyl diethoxysilane, isobutyl trimethoxysilane, vinyl trimethoxysilane, vinyl triethoxysilane, vinyl-tris-(β-methoxyethoxy)silane, 3,3,3-trifluoropropyl trimethoxysilane, methyl-3,3,3-trifluoropropyl dimethoxysilane, β-(3,4 epoxy cyclohexyl)ethyl trimethoxysilane, γ-glycidoxytripropyl trimethoxysilane, γ-glycidoxypropyl methyl diethoxysilane, γ-glycidoxypropyl triethoxysilane, γ-methacryloxypropyl methyl dimethoxysilane, γ-methacryloxypropyl trimethoxysilane, γ-methacryloxypropyl methy diethoxysilane, γ-methacryloxypropyl triethoxysilane, N-β(aminoethyl) γ-aminopropyl methyl dimethoxysilane, N-β(aminoethyl) γ-aminopropyl trimethoxysilane, N-β(aminoethyl) γ-aminopropyl triethoxysilane, γ-aminopropyl trimethoxysilane, γ-aminopropyl triethoxysilane, N-phenyl-γ-aminopropyl trimethoxysilane, γ-mercaptopropyl trimethoxysilane trimethyl silanole, methyl trichlorosilane, methyl dichlorosilane, dimethyl dichlorosilane, trimethylchlorosilane, phenyl trichlorosilane, diphenyl dichlorosilane, vinyl trichlorosilane, trimethyl bromosilane, diethylsilane, and acryloxypropyl methoxysilane.

Of these substances, silane having an acrylic group, silane having a methacrylic group, and the 3,3,3-trifluoropropyl trimethoxysilane are especially preferable.

There is no specific restriction over a quantity of added alkali catalyst, and although the quantity varies according to a type of the alkali catalyst, the quantity of added alkali is preferably in the range from 20 to 2,000 ppm against a quantity of the organosol in which the hollow silica microparticles are dispersed. When the quantity is less than 20 ppm, sometimes the reaction of the silane compound on the surface of the hollow silica does not proceed. On the other hand, when the quantity is over 2,000 ppm, sometimes dispersibility of the hollow silica microparticles in a binder may drop because of the surplus alkali, or other negative influences may occur due to the alkali catalyst remaining in the composition for forming a transparent coating film.

There is no specific restriction over a type of the alkali catalyst used in the present invention, and such catalysts as an ammonia, a hydroxide of an alkali metal, or an amine compound are advantageously used. The alkali catalyst may be added as an aqueous solution thereof.

A quantity of water in a reactant solution is preferably in the range from 0.1 to 50 W %, more preferably 10 W % or below, and still further preferably 5 W % or below against a quantity of added silica (the hollow silica microparticles). When the quantity of water is in the range from 0.1 to 50 W %, a surface of the hollow silica microparticles reacts with the silane compound and the surface processing is carried out efficiently. When the quantity is less than 0.1 W %, the efficiency of the surface processing is low, and the processing is not carried out in the stable state. When the quantity is 50 W % or more, the silane compounds are apt to react with themselves, and as a result the surface processing of the hollow silica microparticles is not carried out sufficiently.

When a reaction between the hollow silica microparticles and the silane compound is performed at a temperature of less than 30° C., the reaction speed is low, so that employment of a reaction temperature of less than 30° C. is not practical. On the other hand, when the reaction temperature is over a boiling point of the organosol solvent, the solvent evaporates to cause increase of the water content, which is not preferable. When the reaction is carried out by using a pressure container, the reaction may be carried out at a temperature of up to 300° C. Preferably the reaction temperature should be 40° C. or more but less than a boiling point of the solvent.

When a period of time for the reaction between the hollow silica microparticles and the silane compound is less than 0.1 hours, sometimes the reaction does not proceed sufficiently, and therefore employment of the reaction time of less than 0.1 hours is not practical. On the other hand, when the reaction time is over 100 hours, such parameters as the yield are not improved, so that it is not necessary to make the reaction proceed for so long a time. Preferably the reaction time is set to the range from 3 hours to 30 hours.

There is no specific restriction over the sequence of adding the silane compound and the alkali catalyst to the organosol in which the hollow silica microparticles are dispersed, and it is allowable (1) to add the alkali catalyst first and then add the silane compound, (2) to add the silane compound first and then add the alkali catalyst, or (3) to simultaneously add the silane compound and the alkali catalyst, but the sequence (1) or (2) is relatively preferable.

Example of a Method of Producing Hollow Silica Microparticles (1)

The present invention provides a method of hollow silica microparticles, the method comprising the steps of preparing an organosol with the silica concentration of 1 to 70 W % in which the hollow silica microparticles according to the present invention are dispersed in an organic solvent; and adding a silane compound and an alkali catalyst to the organosol to react the silane compound with the hollow silica microparticles under the condition that a quantity of water is in the range from 0.1 to 50 W % against a quantity of silica blended therein at a temperature in the range from 30 to 300° C. Preferably the quantity of added silane compound is in the range from 1 to 50 weight portions against 100 weight portions of the hollow silica microparticles, while the concentration of added alkali catalyst in the organosol is preferably in the range from 20 to 2,000 ppm.

The hollow silica microparticles obtained by the production method according to the present invention show weight loss of 1.0 W % or more when measured by the thermogravimetry (TG) at a temperature in the range from 200° C. to 500° C., and also show a positive DTA peak when measured by the differential thermogravimetric analysis (DTA) in the same temperature range, and the composition for forming a transparent film containing the hollow silica microparticles and the binder as described above is excellent in the adhesiveness with a substrate, the capability of preventing whitening, and abrasion resistance.

Example of a Method of Producing Hollow Silica Microparticles (2)

The present invention provides in another aspect a different method of producing hollow silica microparticles, and the method comprises the steps of producing an organosol with the silica concentration of 1 to 70 W % in which hollow silica microparticles are dispersed, and adding a silane compound and/or a multifunctional acrylic acid ester resin having a hydrophobic functional group, and an alkali catalyst to the organosol at a temperature in the range from 30° C. to 300° C. to react the silane compound to the hollow silica microparticles under the condition where a quantity of water against a quantity of added silica is in the range from 0.1 to 50 W %.

In the production method in this aspect of the present invention, a multifunctional acrylic acid ester resin having a hydrophobic functional group, or a mixture of a silane compound and the multifunctional acrylic acid ester resin having a hydrophobic functional group is used in place of the silane compound used in the production method described above.

The multifunctional acrylic acid ester resins having a hydrophobic functional group in the production method include, but not limited to pentaerythrytol triacrylate, pentaerythrytol tetraacrylate, trimethylol propane tri(metha)acrylate, pentaerythrytol tetraacrylate, ditrimethylolpropane tetra(metha)acrylate, dipentaerythrytol hexaacrylate, methyl methacrylate, ethyl methacrylate, butyl methacrylate, isobutyl methacrylate, 2-ethylhexyl methacrylate, isodecyl methacrylate, n-lauryl acrylate, n-stearyl acrylate, 1,6-hexanediol dimethacrylate, perfluorooctylethyl methacrylate, trifluoroethyl methacrylate, urethane acrylate.

When the multifunctional acrylic acid ester resin having hydrophobicity is used, there is not any specific restriction over the weight ratio of the resin versus the hollow silica microparticles (a weight of the multifunctional acrylic acid ester resin having hydrophobicity versus a weight of the hollow silica microparticles), but generally the ratio of 0.001 to 2 is preferable, and the ratio of 0.005 to 1.5 is further preferable.

[Compositions for Forming a Transparent Coating Film]

The composition for forming a transparent coating film contains the hollow silica microparticles according to the present invention and a binder.

The binder is a component enabling formation of a coating film on a surface of a substrate, and is selected from such materials as organic resins from the view points of adhesiveness to a substrate, hardness, adaptability to coating, and the like. An organic resin, a hydrolysable organic silicon compound, or a partial hydrolyte thereof is selected according to the necessity, and the component is generally dispersed in a solvent for use.

Examples of the binder include, but not limited to a polyester resin, an acrylic resin, a urethane resin, a vinyl chloride resin, an epoxy resin, a melamine resin, a fluorine resin, a silicone resin, a butyral resin, a phenol resin, a vinyl acetate resin, a UV cure resin, an electron beam cure resin, an emulsion resin, a water-soluble resin, a hydrophilic resin, a mixture of the resins, a resin for coating such as a copolymer of the resins or a denatured one, a hydrolysable organic silicon compound such as alcoxysilane, or partial hydrolytes thereof. When a hydrolysable organic silicon compound is used as a binder, for instance, water and a catalyst (an acid or an alkali) are added to a mixture solution of alkoxysilane and alcohol to prepare a partial hydrolyte of the alkoxysilane, and the partial hydrolyte is used as the binder.

The composition for forming a transparent coating film according to the present invention contains 10 to 10,000 weight portions of the binder as a solid phase against 100 weight portions of silica in the hollow silica microparticles (silica contained therein). When the quantity of the binder is less than 10 weight portions, sometimes a desired hardness of the coating film can not be obtained, or the composition is not cured. When the quantity is over 10,000 weight portions, the desired low refractive index is not provided. A quantity of the added binder against 100 weight portions of the hollow silica microparticles is preferably in the range from 50 to 1000 weight portions.

The composition for forming a transparent coating film according to the present invention may contain a photoinitiator, a catalyst for curing, or the like according to a method of curing the binder.

Examples of the photoinitiator and catalysts for curing include, but not limited to radical initiators such as peroxides, and azo compounds, titanium compounds, tin compounds, platinum catalyst, and isocyanate.

The composition for forming a transparent coating film according to the present invention is generally prepared by mixing an organosol in which the hollow silica microparticles according to the present invention are dispersed with a binder. The binder may be dispersed with an organic solvent as described above. Mixing of the organosol and the binder may be performed in the range of the weight ration described above by using a mixer or the like with active agitation to obtain the composition for forming a transparent coating film according to the present invention.

The composition for forming a transparent coating film according to the present invention contains an organic solvent originated from the organosol or the binder, and is diluted with an organic solvent according to the application. In this case, the composition for forming a transparent coating film according to the present invention is preferably diluted with 100 to 5000 weight portions of an organic solvent against 100 weight portions of solid components including the hollow silica microparticles according to the present invention and the binder.

The solvent may be subjected to solvent substitution according to a type of a surface functional group present on a surface of a used substrate or on a surface of the surface-coated hollow silica microparticles. The solvents available for the purpose described above include, but not limited to alcohols such as methanol, ethanol, isopropanol, n-butanol, and methyl isocarbinol; ketones such as acetone, 2-butanone, ethyl amyl ketone, diacetone alcohol, isohoron, and cyclohexanone; amides such as N,N-dimethyl formamide, and N,N-dimethyl acetoamide; ethers such as diethyl ether, isopropyl ether, tetrahydrofuran, 1,4-dioxane, 3,4-dihydro-2H-pyran; glycol ethers such as 2-methoxy ethanol, 2-ethoxy ethanol, 2-butoxy ethanol, and ethylene glycol dimethyl ether; glycol ether acetates such as 2-methoxy ethyl acetate, 2-ethoxy ethyl acetate, and 2-butoxy ethyl acetate; esters such as methyl acetate, ethyl acetate, isobutyl acetate, amyl acetate, ethyl lactate, and ethylene carbonate; aromatic hydrocarbons such as benzene, toluene, and xylene; aliphatic hydrocarbons such as hexane, heptane, iso-octane, and cyclohexane; halogenated hydrocarbons such as methylene chloride, 1,2-dichlor ethane, dichloropropane, and chlorbenzene; sulfoxides such as dimethyl sulfoxide; and pyrrolidones such as N-methyl-2-pyrrolidone, and N-octyl-2-pyrrolidone. The dispersing medium may be used singly or in combination. Of these solvents, a polar solvent is especially preferable.

It is allowable to add an antiseptic agent, an antibiotic agent, an antifoaming agent, a ultraviolet degradation inhibiting agent, a coloring agent, a leveling agent or the like to the composition for forming a transparent coating film according to the present invention, if required.

Preferable example of the composition for forming a transparent coating film (1)

A preferable example of the composition for forming a transparent coating film according to the present invention contains the hollow silica microparticles having the surface charge ($Q_A$) in the range from 5 to 20 µeq/g, the binder, and a polar solvent. A concentration ($C_{PA}$) of the hollow silica microparticles in the preferable example is in the range from 0.1 to 20 W %, and a concentration ($C_M$) of the binder as a solid component is in the range from 1 to 50 W %.

The surface charge ($Q_A$) of the hollow silica microparticles is preferably in the range from 5 to 20 µeq/g, and more preferably in the range from 6 to 18 µeq/g. When the surface charge ($Q_A$) of the hollow silica microparticles is in the range described above, the phenomenon that the hollow silica microparticles are unevenly distributed easily occurs in a substrate with a coating film obtained by curing the composition for forming a transparent coating film containing the hollow silica microparticles as described above on a substrate, and the hollow silica microparticles are unevenly distributed and dispersed in the outer side from a middle point of the coating film in the thickness direction. The hollow silica microparticles may be dispersed either in the single-layered state or in the multi-layered state, and also the hollow silica microparticles may be dotted.

When the surface charge ($Q_A$) of the hollow silica microparticles is less than 5 eq/g, in the coating film obtained by curing the composition for forming a transparent coating film containing the hollow silica microparticles, the tendency for homogeneous dispersion of the hollow silica microparticles becomes stronger. When the surface charge ($Q_A$) of the hollow silica microparticles is over 20 µeq/g, sometimes the particles may not be hollow. Furthermore whitening easily occurs in the coating film obtained by curing the composition for forming a transparent coating film containing the hollow silica microparticles, and the hollow silica microparticles are apt to be dispersed homogeneously in the coating film.

As for a quantity of hollow silica microparticles contained in the composition for forming a transparent coating film, the concentration ($C_{PA}$) of the hollow silica microparticles is preferably in the range from 0.1 to 20 W %, and a concentration ($C_M$) of the binder as a solid content is preferably in the range from 1 to 50 W %.

When the concentration ($C_{PA}$) of the hollow silica microparticles is less than 0.1 W %, in the coating film prepared by curing the composition for forming a transparent coating film containing the hollow silica microparticles, it is difficult to achieve the optical characteristics and the electric characteristics provided by uneven distribution and dispersion of the hollow silica microparticles. When the concentration ($C_{PA}$) of the hollow silica microparticles is over 20 W %, the tendency for homogeneous dispersion of the hollow silica microparticles becomes stronger in the coating film obtained by curing the composition for forming a transparent coating film containing the hollow silica microparticles. The concentration ($C_{PA}$) of the hollow silica microparticles is preferably in the range from 1 to 10 W %.

An average particle diameter of the hollow silica microparticles used in the present invention is preferably in the range from 5 to 300 nm. The hollow silica microparticles according to the present invention should more preferably have the average particle diameter in the range from 10 to 200 nm, and further preferably in the range from 10 to 100 nm.

The method of producing the composition for forming a transparent coating film described above is applied also to produce the composition for forming a transparent coating film in the preferable example (1) of the composition for forming a transparent coating film.

Preferable Example of a Composition for Forming a Transparent Coating Film (2)

As another preferable example of the composition for forming a transparent coating film according to the present invention, there can be enlisted a composition for forming a transparent coating film containing hollow silica microparticles with the surface charge ($Q_A$) in the range from 5 to 20 µeq/g, metal oxide particles with the surface charge ($Q_B$) in the range from 51 to 150 µeq/g, a binder, and a polar solvent, and the composition is characterized in that a value of the difference between the surface charge ($Q_B$) of the metal oxide particles and the surface charge ($Q_A$) of the hollow silica microparticles [($Q_B$)–($Q_A$)] is in the range from 20 to 100 µeq/g, the concentration ($C_{PA}$) of the hollow silica microparticles is in the range from 0.1 to 20 W %, the concentration ($C_{PB}$) of the metal oxide particles is in the range from 0.1 to 20 W %, and the concentration ($C_M$) of the binder as a solid component is in the range from 1 to 50 W %.

Because the surface charge ($Q_A$) of the hollow silica microparticles is in the range from 5 to 20 µeq/g, the surface charge ($Q_B$) of the metal oxide particles is in the range from 51 to 150 µeq/g, and a value of the difference between the surface charge ($Q_B$) of the metal oxide particles and the surface charge ($Q_A$) of the hollow silica microparticles [($Q_B$)–($Q_A$)] is in the range from 20 to 100 µeq/g, when the composition for forming a transparent coating film is cured and converted to a coating film, the tendency becomes stronger that the metal oxide particles are unevenly distributed and dispersed in the inner side from the middle point of the transparent coating film in the thickness direction, namely in the side closer to the substrate and the hollow silica microparticles are unevenly distributed and dispersed in the outer side from the middle point of the coating film in the thickness direction, namely in the side closer to the surface.

It can be guessed that the phenomenon occurs because of the electrical repulsion between the hollow silica microparticles and the metal oxide particles. When the value of the difference between the surface charge ($Q_B$) of the metal oxide particles and the surface charge ($Q_A$) of the hollow silica microparticles [($Q_B$)–($Q_A$)] is less than 20 µeq/g, because the electrical repulsion between the hollow silica microparticles and the metal oxide particles is small, the tendency becomes weaker that the two types of microparticles repulse each other and are distributed in different portions of the coating film.

When the value of [($Q_B$)–($Q_A$)] is over 100 µeq/g, a difference in surface charge between the two types of microparticles is too large, and the hollow silica microparticles and the metal oxide particles easily aggregate respectively.

Both the concentration ($C_{PA}$) of the hollow silica microparticles and the concentration ($C_{PB}$) of the metal oxide particles are preferably in the range from 0.1 to 20 W % respectively. When the concentrations are in this range, the hollow silica microparticles and the metal oxide particles are unevenly distributed and dispersed in the coating film respectively. On the other hand, when the concentrations are lower than the range, the effects provided by uneven distribution and dispersion of the two types of microparticles are hardly shown. When the two concentrations are over the range, the tendency becomes stronger than the two types of microparticles are distributed and dispersed homogenously in the coating film. Both of the concentration ($C_{PA}$) of the hollow silica microparticles and the concentration ($C_{PB}$) of the metal oxide particles are preferably in the range from 1 to 10 W % respectively.

As for the types of the metal oxide particles, if the coating film is used as a hard coat film, metal oxide microparticles of $ZrO_2$, $TiO_2$, $Sb_2O_5$, $ZnO_2$, $Al_2O_3$, $SnO_2$, chained particles in which the microparticles above are coupled to each other in the chain-like state, or silica particles with the refractive index of 1.45 or below can advantageously be used.

When the transparent coating film is used as a high refractive index film, it is preferable to use the metal oxide particles having a refractive index of 1.60 or more, or further preferable to use the metal oxide particles having the refractive index of 1.80 or more, and more specifically any of $ZrO_2$, $TiO_2$, $Sb_2O_5$, $ZnO_2$, $Al_2O_3$, $SnO_2$, antimony-doped tin oxide, tin-doped indium oxide, tin oxide-doped phosphorus (PTO) or the like can advantageously be used.

When the transparent coating film is used as a conductive film, it is generally preferable to use, as the metal oxide particles, microparticles of $Sb_2O_5$, $SnO_2$, antimony-dopes tin oxide, tin-dopes indium oxide, tin oxide-doped phosphorus (PTO), silica-based microparticles or silica-based microparticles having cavities therein with the surface coated with any of the conductive materials.

If required, the metal oxide particles having been processed with the silane compound may be used, and furthermore, in the method of producing hollow silica microparticles in the fifth aspect of the present invention, it is allowable to use metal oxide particles in place of the hollow silica microparticles.

When the composition for forming a transparent coating film containing both hollow silica microparticles and metal oxide particles is used, by applying the coating film onto a substrate, it is possible to obtain a transparent coating film-coated substrate coated with the transparent coating film in which the metal oxide particles are unevenly distributed and dispersed in the inner side from the middle point of the coating film, namely in the side closer to the substrate and the hollow silica microparticles are unevenly distributed and dispersed in the outer side from the middle point, namely in the side closer to the surface thereof.

Also in the method of producing a composition for forming a transparent coating film in the preferable example (2) described above, the metal oxide particles may be added during the process of producing the composition for forming a transparent coating film.

Transparent Film-coated Substrate

The transparent film-coated substrate according to the present invention is prepared by curing the composition for forming a transparent coating film with or without any other coating film on a substrate.

There is not any specific restriction over a type of the substrate so long as the substrate is a solid material enabling formation of a coating film. It is allowable to use, as the substrate, for instance, glass, polycarbonate, acryl resin, PET, TAC (triacetyl cellulose), an MS substrate (a copolymer of methyl methacrylate and styrene), a polyolefin-based substrate, or the like. Forms of the substrates include, for instance, a plastic sheet, a plastic film, a plastic lens, a plastic panel, a cathode-ray tube, a fluorescent display tube, a liquid crystal display panel, or the like.

As the other examples of coating film, there can be enlisted, for instance, a hard coat film, a flattened film, a high refractive index film, an insulating film, a conductive resin film, a conductive metal microparticle film, a conductive metal oxide microparticle film, a film made of a primer or the like.

It is to be noted that the transparent film-coated substrate according to the present invention may be further coated for any specific application.

The transparent film-coated substrate according to the present invention can be obtained by applying the composition for forming a transparent coating film onto a substrate with any known method such as the dip method, the spray method, the spinner method, or the roll coat method, drying the composition, and furthermore curing the applied composition by heating or by irradiation of ultraviolet rays according to the necessity.

When the composition is cured by irradiating ultraviolet rays, for instance, the composition for forming a transparent coating film according to the present invention is applied onto a substrate, then the applied composition is preliminarily dried at a temperature in the range from 70° C. to 100° C., and then is cured by irradiating ultraviolet rays with a high-pressure mercury lamp or a fusion lamp by adjusting the wavelength to an absorption wavelength of the initiating agent, namely to the range from 300 to 1,000

A refractive index of the transparent coating film according to the present invention formed on a substrate varies according to a mixing ratio of hollow silica microparticles versus a binder and also according to a refractive index of the binder, generally the refractive index is low, namely in the range from 1.15 to 1.42.

Preferable Example of a Transparent Film-Coated Substrate (1)

As a preferable example of the transparent film-coated substrate according to the present invention, there can be enlisted, for instance, a transparent film-coated substrate in which the hollow silica microparticles having the average particle diameter of 5 to 300 nm and a binder are distributed on a surface thereof (with the film thickness of 100 nm to 10000 nm). In this transparent film-coated substrate, the hollow silica microparticles are unevenly distributed and dispersed in the outer side from a middle point of the coating film, namely in the side closer to the surface.

In the transparent film-coated substrate, the hollow silica microparticles are unevenly distributed and dispersed in the outer side from a middle point of the coating film in the thickness direction, namely in the side closer to the surface as described above, and also the hollow silica microparticles are present in the single-layered state or in the multilayered state, or may be dotted. When the hollow silica microparticles are unevenly distributed and dispersed in the single-layered state or in the multilayered state, the transparent coating film shows the strong effect of preventing reflection caused by a low refractive index of the hollow silica microparticles or of preventing electrification due to conductivity of the hollow silica microparticles.

Preferable Example of a Transparent Film-Coated Substrate (2)

Another preferable example of the transparent film-coated substrate according to the present invention is a transparent film-coated substrate having a transparent coating film (with the film thickness of 100 nm to 10000 nm) which is formed on a surface of the substrate and in which metal oxide microparticles with the average particle diameter of 1 to 50 nm, the hollow silica microparticles with the average particle diameter of 5 to 300 nm, and a binder are distributed. The transparent film-coated substrate is furthermore characterized in that the metal oxide microparticles are unevenly distributed and dispersed in the inner side from a middle point of the transparent coating film, namely in the side closer to the substrate, and the hollow silica microparticles are unevenly distributed and dispersed in the outer side from the middle point, namely in the side closer to the surface.

Because the hollow silica microparticles and the metal oxide microparticles are present in the single-layered state or in the multilayered state, the transparent film-coated substrate has both the characteristics provided by the hollow silica microparticles (including the property to prevent reflection and the property to prevent electrification) and the characteristics provided by the metal oxide microparticles (including the abrasion resistance, adhesiveness to the substrate, properties cause of the high refractive index, conductivity, and the like).

INDUSTRIAL APPLICABILITY

The composition for forming a transparent coating film containing the hollow silica microparticles according to the present invention and the transparent film-coated substrate according to the present invention can be applicable to various applications requiring a low refractive index, abrasion resistance, and adhesiveness, and can be used in surface coating for display devices, in optical coating for lenses or the like.

EXAMPLE FOR REFERENCE

[Preparation of Hollow Silica Microparticles as a Raw Material]

100 g of a silica sol containing silica microparticles with the average diameter of 5 nm and having the $SiO_2$ concentration of 20 W % was mixed with 1900 g of pure water to prepare a mother liquid for reactions, and the mother liquid was heated to 80° C. pH of the mother liquid was 10.5, and 9,000 g of an aqueous solution of sodium silicate with the $SiO_2$ concentration of 1.17 W % and 9,000 g of sodium aluminate with the $Al_2O_3$ concentration of 0.83 W % were simultaneously added to the mother liquid. During this process, a temperature of the reactant liquid was preserved at 80° C. pH of the reactant liquid rose to 12.5 immediately after addition of the sodium silicate and sodium aluminate, and then changed little. After completion of the materials, the reactant liquid was cooled down to the room temperature and cleaned with an ultrafilter membrane to prepare a dispersion liquid of primary particles containing $SiO_2$ and $Al_2O_3$ with the solid component concentration of 20 W %.

Then 500 g of the dispersion liquid of primary particles containing $SiO_2$ and $Al_2O_3$ was sampled, and 1,700 g of pure water was added to the sample. The mixture liquid was heated to 98° C. and 50,400 g of sodium sulfate with the concentration of 0.5 W % was added to the mixture liquid preserved at the temperature above. Then, 3,000 g of the sodium silicate aqueous solution with the $SiO_2$ concentration of 1.17 W % and 9,000 g of the sodium aluminate aqueous solution with the $Al_2O_3$ concentration of 0.5 W % were added to the mixture liquid to obtain a dispersion liquid of composite oxide microparticles. The dispersion liquid was cleaned with a ultrafilter membrane to obtain a dispersion liquid of composite oxide microparticles with the solid phase concentration of 13 W %.

1,125 g of pure water was added to 500 g of the dispersion liquid of the composite oxide particles, and furthermore concentrated hydrochloric acid (35.5%) was dripped into the mixture liquid to adjust the pH to 1.0 for removing aluminum. Then, the dissolved aluminum salt was separated with a ultrafilter membrane adding 10 litters of hydrochloric acid aqueous solution with the pH of 3 and 5 litters of pure water and cleaned to obtain a dispersion liquid of silica-based microparticles (1) with the solid phase concentration of 20 W %.

1500 g of the aqueous dispersion liquid of the silica-based microparticles with the solid phase concentration of 20 W %, 500 g of pure water, 1,750 g of ethanol, and 626 g of 28% ammonia water were mixed, and the mixture liquid was heated to 35° C. Then 104 g of ethyl silicate (with the $SiO_2$ concentration of 28 W %) was added to the heated mixture solution to form a silica coating film. Then, the mixture solution was cleaned with a ultrafilter membrane, adding 5 litters of pure water, to prepare a dispersion liquid of the silica-based microparticles (2) with the solid phase concentration of 20 W %.

Then, the dispersion liquid of the silica-based microparticles (2) was subjected to hydrothermal processing for 11 hours at 200° C., and the dispersion liquid was cleaned with a ultrafilter membrane, adding 5 litters of pure water, to adjust the solid phase concentration to 20 W %. Then, by using a ultrafilter membrane, a dispersion medium of the dispersion liquid was substituted with ethanol to prepare an organosol with the solid phase concentration of 20 W %.

The organosol contained hollow silica microparticles with the average particle diameter of 46 nm, the specific surface area of 123 m$^2$/g, and the pore volume of 0.4596 ml/g. This organosol is referred to as "hollow silica sol A" hereinafter.

Example 1

[Preparation of the Hollow Silica Microparticles According to the Present Invention]

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 100 ppm, and the mixture solution was sufficiently mixed. Then 4 g of methacrylsilane (produced by Shin-Etsu Chemical Co., Ltd.: KBM503) (by about 20 weight portions against 100 weight portions of $SiO_2$) was added to the mixture solution to obtain a reactant liquid (with the water content of 0.6 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

[Analysis of the Hollow Silica Sol Containing Surface-Coated Silica Particles]

An average particle diameter and a specific surface area of the particles contained in the organosol were measured. Furthermore the thermogravimetry and differential thermogravimetrical analysis (TG and TDA) were simultaneously conducted for the organosol, and furthermore a surface charge of the microparticles was measured. A result of the measurement is shown in Table 1 together with results in other examples and in comparative examples.

Average Particle Diameter

The average particle diameter was measured with a particle diameter distribution measurement device (produced by Otsuka Electronics Co., Ltd.: LP-510 Model PAR-III based on the measurement principle of light scattering method) by the light scattering method using a laser beam.

More specifically, the sample silica sol was diluted with a 0.58% ammonia water to adjust the silica concentration to 1 W %, and the average particle diameter was measured with the particle diameter measurement device described below.

Specific Surface Area 50 ml of sample sol was dried for 20 hours at 110° C., and the specific surface area was measured with the specific surface area measurement device (produced by Yuasa Ionics CO. Ltd.,: Multisorb 12) by the nitrogen adsorption method (BET method).

More specifically, $HNO_3$ was added to 50 ml of the silica sol to adjust the pH to 3.5, and then 40 ml of 1-propanol was added and the mixture solution was dried for 20 hours at 110° C. to obtain the sample. The sample was pulverized in a mortar, and was calcinated for 1 hour at 500° C. in a muffle furnace to obtain a sample for measurement. Then the specific surface area was calculated with the specific surface area measurement device (produced by Yuasa Ionics CO. Ltd.,: Multisorb 12) by the nitrogen adsorption method (BET 1-point method).

More specifically, 0.5 g of the sample was put in a measurement cell and was degassed for 20 minutes at 300° C. in a flow of a mixed gas of nitrogen by 30 volume % and helium by 70 volume %. Then the sample was preserved at the liquid nitrogen temperature in the mixed gas flow so that nitrogen was adsorbed into the sample in the equilibrium state. Then, a temperature of the sample was gradually raised to the room temperature by continuously flowing the mixed gas to detect a quantity of nitrogen desorbed in the process, and a specific surface area of the silica sol was calculated by referred to an analytical curve previously prepared.

Concurrent Measurement by Thermogravimetry and Differential Thermogravimetrical Analysis (TG/DTA)

Concurrent measurement by thermogravimetry and differential thermogravimetrical analysis was performed with a differential thermogravimetrical analysis device (produced by Rigaku Corporation: Themoplus TG8110). The measurement was performed in the atmospheric air at the temperature rising rate of 10° C./minute and at a temperature from the room temperature to 500° C.

The sample for the concurrent measurement by thermogravimetry and by differential thermogravimetrical analysis (TG/TDA) of the hollow silica microparticles employed in Example 1, in all of other examples, and in all of comparative examples was prepared by removing a solvent from the organosol prepared as described above, sufficiently cleaning the remaining materials to remove hexane, and then drying with a reduced-pressure drier. A weight of the powder as the sample was 15 mg, and the sample was used in the measurement.

The hollow silica microparticles used in Examples 1 to 10, Comparative example 3, and in Examples 13 to 16 showed a positive peak due to the exothermal reaction at a peak position (temperature) shown in Table 1, when plotting with the X axis indicating a temperature and Y axis indicating a heat value, in the differential thermogravimetric analysis (DTA) performed at a temperature in the range from 200° C. to 500° C.

Surface Charge of Microparticles

As for the method of measuring a surface charge of the hollow silica microparticles or the metal oxide microparticles, using the surface charge titrimetric measurement device (Mutek Co., pcd-03), a dispersion liquid of the hollow silica microparticles or the metal oxide microparticles (with the concentration of 1 W %, 15 g) was titrated with 0.001N polychloride diallyl methyl ammonium to obtain a surface charge (μ eq/g) per unit grams of the particles. A result is as shown in Table 1.

Water contents in the organosol and the reactant liquid (1 ml) were measured by putting the samples for measurement in syringes respectively, and 0.1 g to 0.02 g of the samples were measured with the moisture measuring system (produced by Kyoto Electronic Industries Co., Ltd., Karl-Fischer moisture measuring system MKC-510). The measurement was performed in the same way also in other Examples and Comparative Examples.

Example 2

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 400 ppm, and the mixture solution was sufficiently mixed. Then 4 g of methacrylsilane (produced by Shin-Etsu Chemical Co., Ltd.: KBM503) (by about 20 weight portions against 100 weight portions of $SiO_2$) was added to the mixture solution to obtain a reactant liquid (with the water content of 1.0 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 3

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 200 ppm, and the mixture solution was sufficiently mixed. Then 1 g of acrylsilane (produced by Shin-Etsu Chemical Co., Ltd.: KBM5103) (by about 5 weight portions against 100 weight portions of $SiO_2$) was added to the mixture solution to obtain a reactant liquid (with the water content of 0.75 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 4

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 200 ppm, and the mixture solution was sufficiently mixed. Then 2 g of acrylsilane (produced by Shin-Etsu Chemical Co., Ltd.: KBM5103) (by about 10 weight portions against 100 weight portions of $SiO_2$) was added to the mixture solution to obtain a reactant liquid (with the water content of 0.75 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 5

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 200 ppm, and the mixture solution was sufficiently mixed. Then 4 g of acrylsilane (produced by Shin-Etsu Chemical Co., Ltd.: KBM5103) (by about 20 weight portions against 100 weight portions of $SiO_2$) was added to the mixture solution to obtain a reactant liquid (with the water content of 0.75 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 6

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 200 ppm, and the mixture solution was sufficiently mixed. Then 1 g of 3,3,3-trifloropropyl trimethoxysilane (by about 5 weight portions against 100 weight portions of $SiO_2$) was added to the mixture solution to obtain a reactant liquid (with the water content of 0.75 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 7

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 200 ppm, and the mixture solution was sufficiently mixed. Then 2 g of 3,3,3-trifloropropyl trimethoxysilane (by about 10 weight portions against 100 weight portions of $SiO_2$) was added to the mixture solution to obtain a reactant liquid (with the water content of 0.75 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 8

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then a 28% ammonia aqueous solution was added to 100 g of the organosol so that the ammonia concentration would be 200 ppm, and the mixture solution was sufficiently mixed. Then 4 g of 3,3,3-trifloropropyl trimethoxysilane (by about 20 weight portions against 100 weight portions of $SiO_2$) was added to the mixture solution to obtain a reactant liquid (with the water content of 0.75 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 9

200 g of the hollow silica sol A (with the solid silica concentration of 20 W %) was prepared and subjected to solvent substitution to methanol with a ultrafilter membrane to prepare 100 g of an organosol with the $SiO_2$ concentration of 20 W % (and with the water content of 0.5 W % against the amount of $SiO_2$).

Then 4 g of methacrylsilane (produced by Shin-Etsu Chemical Co., Ltd.: KBM503) (by about 20 weight portions against 100 weight portions of $SiO_2$) was added to the mixture solution and then the mixture solution was sufficiently mixed. Then a 28% ammonia aqueous solution was added to 100 g of the organosol so that the ammonia concentration would be 400 ppm to obtain a reactant liquid (with the water content of 1.0 W % against the amount of $SiO_2$). The reactant liquid was heated to 50° C. and preserved at the temperature for 15 hours with agitation. After the heating process was completed, the reactant liquid was cooled down to the room temperature and cleaned with a ultrafilter membrane to prepare an organosol containing coated hollow microparticles with the $SiO_2$ concentration of 20 W %.

Example 10

200 g of the hollow silica sol A (with the solid silica concentration of 20 W %) was prepared and subjected to solvent substitution to methanol with an ultrafilter membrane to prepare 100 g of an organosol with the $SiO_2$ concentration of 20 W % (and with the water content of 0.5 W % against the amount of $SiO_2$).

Then 4 g of methacrylsilane (produced by Shin-Etsu Chemical Co., Ltd.: KBM503) (by about 20 weight portions against 100 weight portions of $SiO_2$) and a 28% ammonia aqueous solution were added simultaneously to the mixture solution so that the ammonia concentration would be 400 ppm to 100 g of the organosol to obtain a reactant liquid (with the water content of 1.0 W % against the amount of $SiO_2$). The reactant liquid was heated to 50° C. and preserved at the temperature for 15 hours with agitation. After the heating process was completed, the reactant liquid was cooled down to the room temperature and cleaned with an ultrafilter membrane to prepare an organosol containing coated hollow microparticles with the $SiO_2$ concentration of 20 W %.

Compared Example 1

200 g of the hollow silica sol A (with the solid silica concentration of 20 W %) was prepared and subjected to solvent substitution to methanol with an ultrafilter membrane to prepare 100 g of an organosol with the $SiO_2$ concentration of 20 W % (and with the water content of 0.5 W % against the amount of $SiO_2$).

Then 4 g of methacrylsilane (produced by Shin-Etsu Chemical Co., Ltd.: KBM503) (by about 20 weight portions against 100 weight portions of $SiO_2$) was added to the mixture solution and then to obtain a reactant liquid (with the water content of 0.5 W % against the amount of $SiO_2$). The reactant liquid was heated to 50° C. and preserved at the temperature for 15 hours with agitation. After the heating process was completed, the reactant liquid was cooled down to the room temperature and cleaned with an ultrafilter membrane to prepare an organosol containing coated hollow microparticles with the $SiO_2$ concentration of 20 W %.

Comparative Example 2

200 g of the hollow silica sol A (with the solid phase silica concentration of 20 W %) was prepared and subjected to solvent substitution to methanol by using a ultrafilter membrane to obtain 100 g of an organosol with the $SiO_2$ concentration of 20 W % (with the water content of 0.5 W % against the amount of $SiO_2$).

Comparative Example 3

200 g of the hollow silica sol A (with the solid silica concentration of 20 W %) was prepared and subjected to solvent substitution to methanol with a ultrafilter membrane to prepare 100 g of organosol with the $SiO_2$ concentration of 20 W % (with the water content of 0.5 W % against $SiO_2$). Then a 28% ammonia aqueous solution was added to 100 g of the organosol so that the ammonia concentration would be 10 ppm, and the mixture solution was sufficiently mixed. Then 4 g of methacrylsilane (produced by Shin-Etsu Chemical Co., Ltd.: KBM503) (by about 20 weight portions against 100 weight portions of $SiO_2$) was added to the mixture solution to obtain a reactant liquid (with the water content of 0.5 W % against the amount of $SiO_2$). The reactant liquid was heated to 50° C. and preserved at the temperature for 15 hours with agitation. After the heating process was completed, the reactant liquid was cooled down to the room temperature and cleaned with an ultrafilter membrane to prepare an organosol containing coated hollow microparticles with the $SiO_2$ concentration of 20 W %.

Example 11

[Preparation of a Composition for Forming a Transparent Coating Film]

100 g of the organosol obtained in each of Examples 1 to 10 and Comparative Examples 1 to 3 (with the solid phase silica content of 20 g) and 3 g of a binder (an acrylic resin: Hitaloid 1007 produced by Hitachi Chemical Co., Ltd.) were mixed with each other, and a photoinitiator (1-hydroxy-cyclohexyl-phenyl-ketone, trademark: Irugacure 184) was added by 3 W % against a sum of silica and the resin to prepare a composition for forming a transparent film.

Example 12

[Production of a Transparent Film-Coated Substrate]

Each of the compositions for forming a transparent coating film obtained in Example 11 was applied to a PET film with a bar coater, and was dried for 1 minute at 80° C. to obtain a transparent film-coated substrate with a transparent coating film having the film thickness of 100 nm.

[Properties and Assessment of a Transparent Film-Coated Substrate]

To assess properties of the transparent film-coated substrate, experiments were conducted to measure the capability to prevent whitening, abrasion resistance, adhesiveness, a refractive index of the transparent coating film, glare-proof capability, pencil hardness, a surface resistance value, an all-optic transmittance, haze, and a reflection coefficient of a ray with the wavelength of 550 nm. The same measurement was performed also in Examples 13 to 16 and in Comparative Example 4 described below. A result is shown in Table 1.

In a case of a PET film not coated with any material, the all-optic transmittance was 90.7%, the hase was 2.0%, and the reflection coefficient of the ray with the wavelength of 550 nm was 7.0%.

Adhesiveness 11 parallel flaws were given with a pitch of 1 mm in the horizontal and vertical directions respectively on a surface of a transparent film-coated substrate to provide 100 squares, and a cellophane tape (registered trademark) were adhered to the surface of the transparent film-coated substrate. Then the cellophane tape was peeled off, and the number of squares on which the cellophane tape was not separated and remaining was counted and the count was classified to any of the following 4 grades to assess the adhesiveness.

A: 95 or more
B: 90 to 94
C: 85 to 89
D: 84 or below

Capability to Prevent Whitening

Capability of preventing whitening was measured for each transparent film-coated substrate, and a result is shown in Table 1. For assessing the effect for preventing whitening, a transparent film-coated substrate was put in a drier and was left there for 30 minutes at a temperature of 80° C. Presence of cracking or whitening was visually observed, and was classified to any of the following three grades.

A: Cracking or whitening was not observed at all.
B: Cracking or whitening was observed a little.
C: Cracking or whitening was observed substantially.

Abrasion Resistance

Abrasion resistance of each transparent film-coated substrate was measured and a result is shown in Table 1. For measuring the abrasion resistance, a piece of #0000 steel wool was used and slid on a surface of the substrate 50 times with the load of 500 g/cm². Then a surface of the coating film was visually observed and the result was classified to any of the following four grades.

A: No streak flaw was observed.
B: A small number of streak flaws were observed.
C: A large number of streak flaws were observed.
D: The entire surface was scraped off.

Refractive Index of a Transparent Coating Film

A refractive index of each transparent coating film was measured with the ellipsometer (produced by ULVAC Corp., EMS-1).

Glare-Proof Capability

A black paint was homogeneously sprayed over a rear surface of each transparent film-coated substrate and the substrate was placed at a position 2 meters away from a 30 W fluorescent lamp. A perception of the fluorescent lamp was visually checked to assess the glare-proof capability.

⊚ The fluorescent lamp was not observed at all.
○ The fluorescent lamp was observed slightly.
Δ The fluorescent lamp was observed, but the contour was blurred.
× The fluorescent lamp was clearly observed.

Pencil Hardness

The pencil hardness was measured according to JIS K 5400 with a pencil hardness tester. Namely, a pencil was set at 45 degrees against a surface of each transparent film-coated substrate, and the pencil was drawn at a prespecified speed under a prespecified load to check presence of a flaw.

Surface Resistance of Each Transparent Film-Coated Substrate

The surface resistance was measured with a surface resistance meter (produced by Mitsubishi Petrochemical Co., Ltd.: LORESTA).

All-Optic Transmittance and Haze

The all-optic transmittance and the haze were measured with a haze meter (produced by Nippon Denshoku Industries Co., Ltd.: NDH2000).

Reflection Coefficient of a Ray with the Wavelength of 550 nm

The reflection coefficient of a ray with the wavelength of 550 nm was measured with the spectrophotometer (produced by JASCO Corporation: Ubest-55).

TABLE 1 - (1)

| | Characteristics of hollow silica microparticles | | | | |
|---|---|---|---|---|---|
| | Average particle diameter nm | Specific surface area m²/g | Percentage of weight loss % | DTA Peak position ° C. | Surface charge $Q_A(Q_B)$ μeq/g |
| Example 1 | 47 | 92 | 2.70 | 280 | 12.5(—) |
| Example 2 | 47 | 75 | 4.00 | 280 | 10.5(—) |
| Example 3 | 47 | 103 | 1.60 | 350 | 18.8(—) |
| Example 4 | 47 | 95 | 2.50 | 350 | 15.5(—) |
| Example 5 | 47 | 80 | 2.50 | 350 | 12.6(—) |
| Example 6 | 47 | 108 | 1.10 | 480 | 11.8(—) |
| Example 7 | 47 | 97 | 1.10 | 480 | 10.4(—) |
| Example 8 | 47 | 83 | 1.10 | 480 | 9.5(—) |
| Example 9 | 47 | 78 | 4.40 | 280 | 11.1(—) |
| Example 10 | 47 | 77 | 4.50 | 280 | 11(—) |
| Comp. Ex 1 | 26 | 121 | 0.41 | — | 28.5(—) |
| Comp. Ex 2 | 46 | 121 | 0.14 | — | 31.5(—) |
| Comp. Ex 3 | 47 | 115 | 0.65 | 280 | 26.5(—) |
| Example 13 | 60 | 65 | 4.50 | 490 | 8.3(—) |
| Example 14 | 60 | 100 | 3.80 | 280 | 18.3(—) |
| Example 15 | 120 | 99 | 4.50 | 350 | 15.3(—) |
| Example 16 | 60 | 65 | 4.50 | 490 | 8.3(52.8) |
| Comp. Ex 4 | 60 | 75 | 0.60 | — | 25(—) |

TABLE 1 - (2)

| | Prevention of whitening | Abrasion resistance | Adhesion | Refractive index | Anti-glare property | Pencil hardness | Surface Resistance Ω/□ | All-optic transmittance % | Haze % | Reflection coefficient % |
|---|---|---|---|---|---|---|---|---|---|---|
| Ex. 1 | A | B | B | 1.30 | ○ | HB | 1E14< | 93.1 | 1.0 | 1.20 |
| Ex. 2 | A | A | B | 1.30 | ○ | H | 1E14< | 93.0 | 1.0 | 1.30 |
| Ex. 3 | A | A | B | 1.30 | ○ | B | 1E14< | 93.2 | 1.0 | 1.00 |
| Ex. 4 | A | A | B | 1.30 | ○ | HB | 1E14< | 93.0 | 1.0 | 1.10 |
| Ex. 5 | A | A | B | 1.30 | ○ | HB | 1E14< | 93.1 | 1.0 | 1.20 |
| Ex. 6 | A | A | B | 1.30 | ○ | B | 1E14< | 93.1 | 1.0 | 0.90 |
| Ex. 7 | A | A | B | 1.30 | ○ | HB | 1E14< | 93.1 | 1.0 | 0.80 |
| Ex. 8 | A | A | B | 1.30 | ○ | H | 1E14< | 93.2 | 1.0 | 0.70 |
| Ex. 9 | A | A | B | 1.30 | ○ | H | 1E14< | 93.1 | 1.0 | 1.30 |
| Ex. 10 | A | A | B | 1.30 | ○ | H | 1E14< | 93.0 | 1.0 | 1.40 |
| Comp. 1 | C | C | C | 1.30 | X | 3B | 1E14< | 90.4 | 2.8 | 1.00 |
| Comp. 2 | C | C | C | 1.30 | X | 3B | 1E14< | 90.1 | 2.5 | 1.00 |
| Comp. 3 | B | C | B | 1.30 | X | 3B | 1E14< | 91.5 | 1.8 | 1.20 |
| Ex. 13 | A | A | B | 1.30 | ○ | 3H | 1E14< | 93.2 | 1.0 | 1.00 |
| Ex. 14 | A | A | B | 1.30 | ○ | 3H | 1E14< | 93.1 | 1.0 | 1.20 |
| Ex. 15 | A | A | B | 1.20 | ⊚ | 3H | 1E14< | 91.4 | 1.0 | 0.80 |
| Ex. 16 | A | A | B | 1.30 | ○ | 3H | 3.00E+10 | 92.8 | 1.0 | 0.90 |
| Comp. 4 | B | C | C | 1.30 | Δ | 3B | 1E14< | 91.9 | 2.3 | 1.50 |

Example 13

[Preparation of a Paint (A-1) for Forming a Transparent Coating Film]

A component with a low refractive index used in this example was a sol in which silica-based hollow microparticles were dispersed (produced by Catalysts and Chemicals Industries Co., Ltd. Thrulya 1420 with the average particle diameter of 60 nm, the concentration of 20.5 W %, dispersing medium: isopropanol, refractive index of the particles: 1.30, and a water content of 0.5 W % against an amount of $SiO_2$), 10 g of perfluorooctyl ethyl triethoxysilane (produced by Toray Dow Corning Corporation: AY43-158E 100%) was added to 100 g of the sol, and then a 28% ammonia aqueous solution was added to the mixture solution so that the ammonia concentration would be 400 ppm against 100 g of the organosol (the water content was 1 W % against the amount of $SiO_2$). The mixture solution was agitated for 5 hours at 40° C. to obtain a sol in which surface-processed hollow microparticles were dispersed (with the solid phase concentration of 20.3%).

A weight loss of the surface-processed silica-based hollow microparticle dispersion sol was measured by the TG-DTA (at a temperature in the range from 200° C. to 500° C.) to find that the weight loss was 4.5%. 0.42 g of an optical initiator (produced by Chibus Specialities (Corp.): Irgacure 184 which is dissolved by IPA and have a solid phase concentration of 10%) and 54.08 g of a mixture solution of isopropanol and methyl isobutyl ketone (with the mixing ratio of 1/1) were mixed with 15.5 g of the surface-processed silica-based hollow microparticle dispersion sol and 30 g of hexaerythrythol tripentaacrylate (produced by Nippon Kayaku Co., Ltd.: KAYARAD DPHA) to prepare a paint for forming a transparent coating film (A-1).

[Preparation of a Transparent Film-Coated Substrate (1)] (Hard Coat+Prevention of Reflection)

The paint for forming a transparent coating film (A-1) was applied on a PET film (with the thickness of 100 μm, the refractive index of 1.65, the substrate transmittance of 88.0%, the haze of 1.0%, and the reflection coefficient of 5.1%) with a bar coater, and the applied paint was died for 1 minute at 70° C. Then the dried paint was cured by irradiating light from a high pressure mercury lamp (80-W/cm) for 1 minute to prepare a transparent film-coated substrate (1). A thickness of the transparent film-coated substrate was 5 μm. A portion of the transparent coating film was cut in a direction vertical to the longitudinal direction, and the cross section was observed with a transmission electron microscope to find that the silica-based hollow microparticles form a layer with the thickness of 100 nm in the upper section, and that only the matrix was present and no particle was observed in the lower section.

Example 14

[Preparation of a Paint (A-2) for Forming a Transparent Coating Film]

A component with a low refractive index used in this example was a sol in which silica-based hollow microparticles were dispersed (produced by Catalysts and Chemicals Industries Co., Ltd. Thrulya 1420 with the average particle diameter of 60 nm, the concentration of 20.5 W %, dispersing medium: isopropanol, refractive index of the particles: 1.30, and a water content of 0.5 W % against an amount of $SiO_2$), 1.88 g of γ-methacrylo oxypropyl trimethoxysilane (produced by Shin-Etsu Silicone Co., Ltd.: KBM-503 with the $SiO_2$ content of 81.2%) was added to 100 g of the sol, and then a 28% ammonia aqueous solution was added to the mixture solution so that the ammonia concentration would be 400 ppm against 100 g of the organosol (the water content was 1 W % against the amount of $SiO_2$). The mixture solution was agitated for 5 hours at 40° C. to obtain a sol in which surface-processed hollow microparticles were dispersed (with the solid phase concentration of 20.3%).

A weight loss of the surface-processed silica-based hollow microparticle dispersion sol was measured by the TG-DTA (at a temperature in the range from 200° C. to 500° C.) to find that the weight loss was 3.8%. 0.42 g of an optical initiator (produced by Chibus Specialities (Corp.): Irgacure 184 which is dissolved by IPA and have a solid phase concentration of 10%) and 54.08 g of a mixture solution of isopropanol and methyl isobutyl ketone (with the mixing ratio of 1/1) were mixed with 15.5 g of the surface-processed silica-based hollow microparticle dispersion sol, 24 g of pentaerythrythol triacetate (produced by Kyoueisha Kagaku Corp.: PE-3A), and 3 g of diethylaminoethyl methacrylate (produced by Kyoueisha Kagaku Corp.: Light ester DE), and the mixture solution was fully agitated to prepare a paint for forming a transparent coating film (A-2).

[Preparation of a Transparent Film-Coated Substrate (2)] (Prevention of Reflection)

The paint for forming a transparent coating film (A-2) was applied on a PET film (with the thickness of 100 µm, the refractive index of 1.65, the substrate transmittance of 88.0%, the haze of 1.0%, and the reflection coefficient of 5.1%) with a bar coater, and the applied paint was died for 1 minute at 70° C. Then the dried paint was cured by irradiating light from a high pressure mercury lamp (80-W/cm) for 1 minute to prepare a transparent film-coated substrate (2). A thickness of the transparent film-coated substrate was 5 µm. A portion of the transparent coating film was cut in a direction vertical to the longitudinal direction, and the cross section was observed with a transmission electron microscope to find that the silica-based hollow microparticles form a layer with the thickness of 100 nm in the upper section, and that only the matrix was present and no particle was observed in the lower section.

Example 15

[Preparation of a Paint for Forming a Transparent Coating Film (A-3)]

A component with a low refractive index used in this example was a sol in which silica-based hollow microparticles were dispersed (produced by Catalysts and Chemicals Industries Co., Ltd. Thrulya 1420-120 with the average particle diameter of 120 nm, the concentration of 20.5 W %, dispersing medium: isopropanol, refractive index of the particles: 1.20, and a water content of 0.5 W % against an amount of $SiO_2$), 1.88 g of γ-acrylo oxypropyl trimethoxysilane (produced by Shin-Etsu Silicone Co., Ltd.: KBM-5103 with the $SiO_2$ content of 81.6%) was added to 100 g of the sol, and then a 28% ammonia aqueous solution was added to the mixture solution so that the ammonia concentration would be 400 ppm against 100 g of the organosol (the water content was 1 W % against the amount of $SiO_2$). The mixture solution was agitated for 5 hours at 40° C. to obtain a sol in which surface-processed hollow microparticles were dispersed (with the solid phase concentration of 20.3%).

A weight loss of the surface-processed silica-based hollow microparticle dispersion sol was measured by the TG-DTA (at a temperature in the range from 200° C. to 500° C.) to find that the weight loss was 4.5%.

0.42 g of an optical initiator (produced by Chibus Specialities (Corp.): Irgacure 184 which is dissolved by IPA and have a solid phase concentration of 10%) and 57.08 g of a mixture solution of isopropanol and methyl isobutyl ketone (with the mixing ratio of 1/1) were mixed with 15.5 g of the surface-processed silica-based hollow microparticle dispersion sol, 24 g of perfluoroethyl acrylate (produced by Kyoueisha Kagaku Corp.: FA-108), and 3 g of diethylaminoethyl methacrylate (produced by Kyoueisha Kagaku Corp.: Light ester DE), and the mixture solution was fully agitated to prepare a paint for forming a transparent coating film (A-3).

[Preparation of a Transparent Film-Coated Substrate (3)] (Hard Coat+Glare-Proof and Antireflection Properties)

The paint for forming a transparent coating film (A-3) was applied on a PET film (with the thickness of 100 µm, the refractive index of 1.65, the substrate transmittance of 88.0%, the haze of 1.0%, and the reflection coefficient of 5.1%) with a bar coater, and the applied paint was died for 1 minute at 70° C. Then the dried paint was cured by irradiating light from a high pressure mercury lamp (80-W/cm) for 1 minute to prepare a transparent film-coated substrate (3). A thickness of the transparent film-coated substrate was 5 µm. A portion of the transparent coating film was cut in a direction vertical to the longitudinal direction, and the cross section was observed with a transmission electron microscope to find that the silica-based hollow microparticles form a layer with the thickness of 120 nm in the upper section, and that only the matrix was present and no particle was observed in the lower section.

Example 16

[Preparation of a Paint for Forming a Transparent, Coating Film (A-4)]

A component with a low refractive index used in this example was a sol in which silica-based hollow microparticles were dispersed (produced by Catalysts and Chemicals Industries Co., Ltd. Thrulya 1420 with the average particle diameter of 60 nm, the concentration of 20.5 W %, dispersing medium: isopropanol, refractive index of the particles: 1.30, and a water content of 0.5 W % against an amount of $SiO_2$), 10 g of perfluorooctyl ethyl triethoxysilane (produced by Toray Dow Corning Corporation: AY43-158E 100%) was added to 100 g of the sol, and then a 28% ammonia aqueous solution was added to the mixture solution so that the ammonia concentration would be 400 ppm against 100 g of the organosol (the water content was 1 W % against the amount of $SiO_2$). The mixture solution was agitated for 5 hours at 40° C. to obtain a sol in which surface-processed hollow microparticles were dispersed (with the solid phase concentration of 20.3%).

A weight loss of the surface-processed silica-based hollow microparticle dispersion sol was measured by the TG-DTA (at a temperature in the range from 200° C. to 500° C.) to find that the weight loss was 4.5%.

As a high refractive index component for prevention of electrification, an ATO microparticle dispersion sol (produced by Catalysts and Chemicals Industries Co., Ltd.,: ELCOM V-3501 with the average particle diameter of 8 nm, the concentration of 20.5 W %, a dispersing medium: ethanol, a refractive index of the particle: 1.75) was used. 0.15 g of γ-acrylo oxypropyl trimethoxysilane (produced by Shin-Etsu Silicone Co., Ltd.: KBM-5103 with the $SiO_2$ content of 81.2%) was mixed in 100 g of this sol. Then 10 g of ultrapure water was added to the mixture, and the resultant mixture solution was agitated for 5 hours at 40° C. to obtain a surface-processed ATO microparticle dispersion sol (with the solid phase content of 20.0%).

A weight loss of the surface-processed ATO microparticle dispersion sol was measured (at a temperature in the range from 200° C. to 500° C.) to find that the weight loss was 0.5%.

0.35 g of an optical initiator (produced by Chibus Specialities (Corp.): Irgacure 184 which is dissolved by IPA and have a solid phase concentration of 10%) and 27.15 g of a mixture solution of isopropanol and methyl isobutyl ketone (with the mixing ratio of 1/1) were mixed with 15.5 g of the surface-processed silica-based hollow microparticle dispersion sol, 30 g of the surface-processed ATO microparticle dispersion sol, and 27 g of hexaerythrythol tripentaacrylate (produced by Nippon Kayaku Co., Ltd.: KAYARAD DPHA) to prepare a paint for forming a transparent coating film (A-4).

[Preparation of a Transparent Film-Coated Substrate (4)] (Hard Coat+Prevention of Electrification and Reflection)

The paint for forming a transparent coating film (A-4) was applied on a TAC film (with the thickness of 80 μm, the refractive index of 1.48, the substrate transmittance of 88.0%, the haze of 0.0%, and the reflection coefficient of 4.8%) with a bar coater, and the applied paint was died for 1 minute at 70° C. Then the dried paint was cured by irradiating light from a high pressure mercury lamp (80-W/cm) for 1 minute to prepare a transparent film-coated substrate (4). A thickness of the transparent film-coated substrate was 5 μm. A portion of the transparent coating film was cut in a direction vertical to the longitudinal direction, and the cross section was observed with a transmission electron microscope to find that the silica-based hollow microparticles form a layer with the thickness of 100 nm in the upper section, and also that the ATO microparticles were present in the matrix in the lower section.

Comparative Example 4

[Preparation of a Paint for Forming a Transparent Coating Film (R-1)]

A component with a low refractive index used in this example was a sol in which silica-based hollow microparticles were dispersed (produced by Catalysts and Chemicals Industries Co., Ltd. Thrulya 1420 with the average particle diameter of 60 nm, the concentration of 20.5 W %, dispersing medium: isopropanol, refractive index of the particles: 1.30, and a water content of 0.5 W % against an amount of $SiO_2$), 1 g of perfluorooctyl ethyl triethoxysilane (produced by Toray Dow Corning Corporation: AY43-158E 100%) was added to 100 g of the sol. The mixture solution was agitated for 5 hours at 40° C. to obtain a sol in which surface-processed hollow microparticles were dispersed (with the solid phase concentration of 20.3%).

A weight loss of the surface-processed silica-based hollow microparticle dispersion sol was measured by the TG-DTA (at a temperature in the range from 200° C. to 500° C.) to find that the weight loss was 0.6%.

0.42 g of an optical initiator (produced by Chibus Specialities (Corp.): Irgacure 184 which is dissolved by IPA and have a solid phase concentration of 10%) and 62.04 g of a mixture solution of isopropanol and methyl isobutyl ketone (with the mixing ratio of 1/1) were mixed with 10.54 g of the surface-processed silica-based hollow microparticle dispersion sol, 24 g of pentaerythrythol triacetate (produced by Kyoueisha Kagaku Corp.: PE-3A), and 3 g of diethylaminoethyl methacrylate (produced by Kyoueisha Kagaku Corp.: Light ester DE), and the mixture solution was fully agitated to prepare a paint for forming a transparent coating film (R-1).

[Preparation of a Transparent Film-Coated Substrate (R-1)] (Hard Coat+Prevention of Reflection)

The paint for forming a transparent coating film (R-1) was applied on a PET film (with the thickness of 100 μm, the refractive index of 1.65, the substrate transmittance of 88.0%, the haze of 1.0%, and the reflection coefficient of 5.1%) with a bar coater, and the applied paint was died for 1 minute at 70° C. Then the dried paint was cured by irradiating light from a high pressure mercury lamp (80-W/cm) for 1 minute to prepare a transparent film-coated substrate (R-1). A thickness of the transparent film-coated substrate was 5 μm. A portion of the transparent coating film was cut in a direction vertical to the longitudinal direction, and the cross section was observed with a transmission electron microscope to find that the silica-based hollow microparticles are homogeneously dispersed in the film.

The invention claimed is:

1. A method of producing hollow silica microparticles, comprising:
preparing an organosol in which raw hollow silica microparticles are dispersed with a silica concentration of 1 to 70 W %; and
adding a silane compound and an alkali catalyst to the organosol at a temperature in a range from 30° C. to 300° C. to react the silane compound with the raw hollow silica microparticles under a condition where a quantity of water against the raw hollow silica microparticles is in a range from 0.1 to 50 W %,
wherein the hollow silica microparticles have
an average particle diameter of 5 to 300 nm when measured by dynamic light scattering method,
a specific surface area of 50 to 1500 $m^2/g$, and
an outer shell in which cavities are formed,
the hollow silica microparticles lose a weight by 1.0 W % or more at a temperature in a range from 200° C. to 500° C. when measured by thermogravimetry (TG),
a quantity of the silane compound added to the organosol is in a range from 1 to 50weight portions against 100 weight portions of the raw hollow silica microparticles, and
a quantity of the alkali catalyst added to the organosol is in a range from 20 to 2,000 ppm against the organosol.

2. The method of producing hollow silica microparticles according to claim 1, wherein the hollow silica microparticles have a positive DTA peak when measured by differential thermogravimetric analysis (DTA) at a temperature in a range from 200° C. to 500° C.

3. The method of producing hollow silica microparticles according to claim 1, wherein the hollow silica microparticles have an organic group directly bonded to a silicon atom on a surface thereof.

4. The method of producing hollow silica microparticles according to claim 3, wherein the organic group is at least one selected from the group consisting of saturated or unsaturated hydrocarbon groups having 1 to 18 carbon atoms and halogenated hydrocarbon groups having 1 to 18 carbon atoms.

5. The method of producing hollow silica microparticles according to claim 4, wherein the hollow silica microparticles have the organic group expressed by general formula (1) or general formula (2), and the hollow silica microparticles lose the weight by 1.5 W % or more at the temperature in the range from 200° C. to 500° C. when measured by thermogravimetry (TG), $$—R—OC(=O)CCH_3=CH_2 \quad (1)$$

$$—R—OC(=O)CH=CH_2 \quad (2),$$

where R is a bivalent hydrocarbon group having 1 to 12 carbon atoms.

6. The method of producing hollow silica microparticles according to claim 4, wherein the hollow silica microparticles have the organic group expressed by general formula (3), $$—R—C_nF_aH_b \quad (3),$$

where
$a+b=2n+1$,
n is an integer of 1 to 3, and
R is a bivalent hydrocarbon group having 1 to 12 carbon atoms.

7. A method of producing hollow silica microparticles, comprising:

preparing an organosol with a silica concentration of 1 to 70 W % in which raw hollow silica microparticles are dispersed in an organic solvent; and adding a silane compound and/or a multifunctional acrylic acid ester resin having a, and an alkali catalyst to the organosol to react the silane compound with the raw hollow silica microparticles under a condition that a quantity of water is in a range from 0.1 to 50 W % against a quantity of silica blended therein, wherein the hollow silica microparticles have
an average particle diameter of 5 to 300 nm when measured by dynamic light scattering method,
a specific surface area of 50 to 1500 m²/g, and
an outer shell in which cavities are formed, the hollow silica microparticles lose a weight by 1.0 W % or more at a temperature in a range from 200° C. to 500° C. when measured by thermogravimetry (TG), a quantity of the silane compound added to the organosol is in a range from 1 to 50 weight portions against 100 weight portions of the raw hollow silica microparticles, and a quantity of the alkali catalyst added to the organosol is in a range from 20 to 2,000 ppm against the organosol.

8. The method of producing hollow silica microparticles according to claim 7, wherein the hollow silica microparticles have a positive DTA peak when measured by differential thermogravimetric analysis (DTA) at a temperature in a range from 200° C. to 500° C.

9. The method of producing hollow silica microparticles according to claim 7, wherein the hollow silica microparticles have an organic group directly bonded to a silicon atom on a surface thereof.

10. The method of producing hollow silica microparticles according to claim 9, wherein the organic group is at least one selected from the group consisting of saturated or unsaturated hydrocarbon groups having 1 to 18 carbon atoms and halogenated hydrocarbon groups having 1 to 18 carbon atoms.

11. The method of producing hollow silica microparticles according to claim 10, wherein the hollow silica microparticles have the organic group expressed by general formula (1) or general formula (2), and the hollow silica microparticles lose the weight by 1.5 W % or more at the temperature in the range from 200° C. to 500° C. when measured by thermogravimetry (TG),

—R—OC(=O)CCH₃=CH₂ (1)

—R—OC(=O)CH=CH₂ (2), where R is a bivalent hydrocarbon group having 1 to 12 carbon atoms.

12. The method of producing hollow silica microparticles according to claim 10, wherein the hollow silica microparticles have the organic group expressed by general formula (3),

—R—C$_n$F$_a$H$_b$ (3), where
$a+b=2n+1$,
n is an integer of 1 to 3, and
R is a bivalent hydrocarbon group having 1 to 12 carbon atoms.

13. The method of producing hollow silica microparticles according to claim 7, wherein
the hollow silica microparticles have
an organic group directly bonded to a silicon atom on a surface thereof, and
surface charge (QA) in a range from 5 to 20µeq/g, and
a positive DTA peak at a temperature in a range from 200° C. to 500 ° C. when measured by differential thermogravimetric analysis (DTA).

14. A method of producing hollow silica microparticles, comprising:
preparing an organosol in which raw hollow silica microparticles are dispersed with a silica concentration of 1 to 70 W %; and adding a silane compound and an alkali catalyst to the organosol at a temperature in a range from 30° C. to 300° C. to initiate a hydrolysis reaction between the silane compound and a silanol group on surfaces of the raw hollow silica microparticles under a condition where a quantity of water against the raw hollow silica microparticles is in a range from 0.1 to 50 W %, thereby bonding an organosilyl group to the surfaces of the raw hollow silica microparticles, wherein the hollow silica microparticles have
an average particle diameter of 5 to 300 nm when measured by dynamic light scattering method,
a specific surface area of 50 to 1500 m²/g, and
an outer shell in which cavities are formed, the hollow silica microparticles lose a weight by 1.0 W % or more at a temperature in a range from 200° C. to 500° C. when measured by thermogravimetry (TG), a quantity of the silane compound added to the organosol is in a range from 1 to 50 weight portions against 100 weight portions of the raw hollow silica microparticles, and a quantity of the alkali catalyst added to the organosol is in a range from 20 to 2,000 ppm against the organosol.

15. The method of producing hollow silica microparticles according to claim 14, wherein the organosilyl group includes a monoorganosilyl group, a diorganosilyl group, or a triorganosilyl group.

* * * * *